June 6, 1933.  A. SAHLI  1,912,407
FRICTION CLUTCH MECHANISM
Filed Aug. 25, 1931
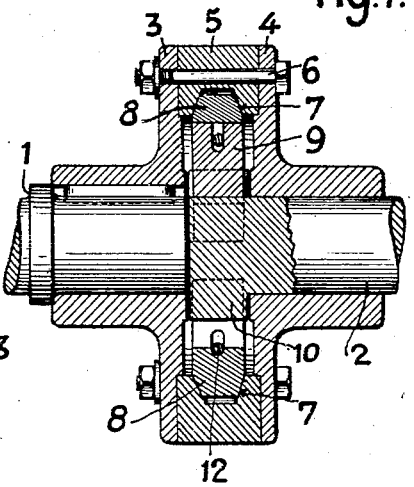
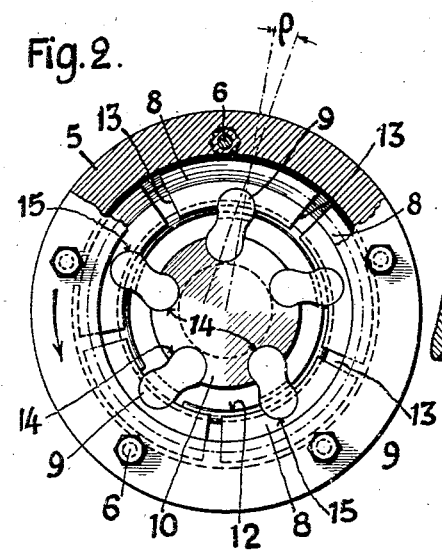
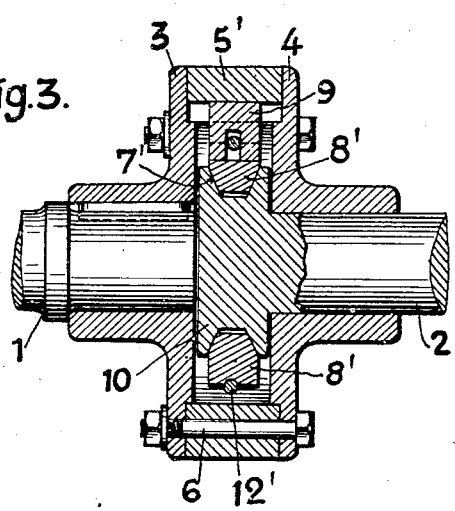
Inventor:

Patented June 6, 1933

1,912,407

UNITED STATES PATENT OFFICE

ARTHUR SAHLI, OF ZURICH, SWITZERLAND

FRICTION CLUTCH MECHANISM

Application filed August 25, 1931, Serial No. 559,268, and in Germany March 7, 1931.

This invention relates to friction clutch mechanisms comprising an inner and an outer part between which, for the purpose of transmission of power and motion, friction segments and locking members are arranged, the locking members being linked on the one hand to the friction segments and on the other hand to the inner or outer part respectively. There are friction drives known the locking members of which consist of bars which are connected to the friction segments and the inner or outer parts respectively by means of eyes and bolts. In many cases the locking members for the purpose of compensating variations in the length are even designed as bars made in two parts having right hand and left hand thread portions respectively which are engaged by a correspondingly constructed screw nut.

To these known friction drives, however, the disadvantage is inherent that they take up too much space, so that in those cases where little space is available they can not be used.

In contradistinction thereto the friction drive according to the present invention is distinguished by relatively small dimensions even for a great power transmission. This result is obtained by constructing the locking members as blunt blocks comprising cylindric ends for engagement with the friction segments and the inner or outer part respectively and a narrowed centre the portions engaging with the locking members being provided with cylindric recesses which surround the cylindric ends of the locking members over an angular range of more than 180°, so that the locking members are restrained from separating from the friction segments and the inner or outer part respectively in the radial direction.

In the accompanying drawing two constructional forms of the invention are illustrated, by way of example only, in which Fig. 1 is an axial section of the first constructional form;

Fig. 2 is an end view of Fig. 1, partly in section, and

Fig. 3 a view similar to Fig. 1 of the second constructional form.

With the first constructional form the inner part is constituted by a collar 10 on the shaft 2, the said collar being provided with cylindric recesses 14. The outer part is in the form of a ring 5 having an annular groove 7 with inclined sides for receiving friction segments that function as wedging segments. This ring is rigidly connected to the flange 3 by means of bolts 6, the flange being securely keyed to the shaft 1. To the ring 5 is also fixed a second flange 4 the hub of which forms a bearing for the shaft 2.

The annular groove 7 is engaged by the friction segments 8, which are urged against the lateral friction surface of the groove 7 by an expansible spring 12, in such manner, as to produce a radial thrust in an outward direction and slight frictional engagement of the segments with the groove, the segments being separated by interstices 13. These interstices are of just sufficient width as required for removing the friction segments from the groove 7 or inserting the same therein respectively. The friction segments 8 have a raised friction surface or surfaces providing wedging surfaces and the segments 8 are also provided with cylindric recesses 15 similar to those of the collar 10.

The locking elements 9 consist of thrust blocks of blunt shape comprising cylindric ends for engagement with the friction members 8 and the collar 10 respectively, and a narrowed middle portion. In this manner the locking members are actually linked to the friction segments 8 and the collar 10, their cylindric ends being surrounded by the recesses 15 and 14 respectively over an angular range of more than 180°.

With the second constructional form the inner part is again provided by a collar on the shaft 2, with the difference that this collar instead of being formed with cylindric recesses as in the first example, is provided with the groove 7' having inclined sides for frictional engagement. The outer part is constituted by a ring 5' which, however, in the stead of the groove 7 of the first example is provided with the recesses corresponding to recesses 14 of Fig. 2 for the locking members. Aside from this, the construction of the friction drive is substantially the same as described in connection with the first example, except that the spring 12' in this case has the tendency to contract and thus produce a radial thrust in an inward direction and thereby a slight frictional engagement of the segment 8' with the grooved portion engaged thereby. The friction segments 8' are tapered on the inner circumference thus providing a raised friction surface or surfaces forming or providing wedging surfaces.

The operation of the described friction drives is as follows. On rotation of the shaft 1, in the direction indicated by the arrow, and the ring 5, rigidly connected thereto, together with it, the friction segments 8 are carried off viz., moved due to the frictional engagement caused by the effort of the springs 12 or 12' respectively. Consequently pressure is exerted on the locking members 9 the magnitude of which corresponds to the relative angular displacement $p$ of the shafts 1 and 2. This increased pressure in turn creates increased frictional engagement between the friction segments and the friction surfaces of the groove 7, whereby again-the pressure exerted on the locking members 9 is augmented and so on. When the torque in the shaft 1 surpasses the resisting momentum of the shaft 2 the latter is turned. When on the other hand the shaft 1 rotates in the opposite direction the frictional engagement between the friction segments 8 and the friction surfaces of the groove 7 is automatically released.

The described friction drive presents even with great loads a relatively small contour owing to the small dimensions required for the movable parts.

I claim:

1. In a friction clutch mechanism, in combination, a driving part and a driven part in telescoped relation to each other, a depressed friction surface in the outer circumference of the inner part, segmental friction means interposed between said two parts, a raised friction surface on the inner side of said segmental friction means for engagement with the depressed friction surface in said inner part, and blunt blocks engaging with said friction means and the outer part for locking the driving part and the driven part in driving association with each other in one direction of movement.

2. A friction clutch device provided with a rotatable driving member and a rotatable driven member and having friction segments, link members, and a spring arranged between the driving and the driven members, wherein the friction segments, as well as one of the rotatable members, are provided with cylindrical recesses which preferably embrace cylindrical ends of the link members to an extent of over 180 degrees, wherein the friction surfaces of the friction segments engage a correspondingly shaped circular friction surface on the other rotatable member, and wherein the spring is in engagement with the friction segments and tends to press radially the friction segments in a direction to engage the rotatable member with which the segments frictionally cooperate, which spring is maintained in place between the friction segments and the link members.

3. In a friction clutch mechanism, in combination, a rotatable driving part and a rotatable driven part in telescoped relation to each other, friction segments interposed between said rotatable parts, a circular friction surface on one of said parts for frictional engagement by corresponding segmental friction surfaces on said friction segments, thrust blocks each having one end thereof engaging with and abutting a friction segment corresponding thereto and the other end engaging with and abutting the other rotatable part for locking the rotatable driving part and the rotatable driven part in driving association with each other in one direction of movement, and a circular spring arrangement constructed so as to provide a radial thrust upon the several friction segments in the direction of the rotatable member frictionally engaged thereby.

4. In a friction clutch mechanism, in combination, a rotatable driving part, a rotatable driven part, friction means comprising segments frictionally engaging one of said parts and clearing the other, there being a circular friction section on the rotatable part which is frictionally engaged by said segments, each segment being provided with a corresponding friction surface portion for frictionally engaging the circular friction section of the rotatable part with which the segment frictionally engages, thrust blocks for locking said rotatable parts in driving association with each other in one direction of movement, there being drum-shaped ends on said blocks, cylindric recesses in said segments and the rotatable part clearing the same, the extent of the walls of said cylindric recesses exceeding 180 degrees and adapting said recessed portions to positively retain said drum-shaped end of the respective blocks, and a circular spring constructed so as to normally press the segments into slight frictional engagement with the rotatable part with which the segments frictionally cooperate.

5. In a friction clutch mechanism, in combination, a rotatable driving part, a rotatable driven part, friction means comprising segments frictionally engaging one of said parts and clearing the other, there being a circular recessed friction section on the rotatable part which is frictionally engaged by the segments, and each segment being provided with correspondingly raised friction surface portions for frictionally engaging the recessed section of the rotatable part with which the segments frictionally engage, the raised friction surface portions of said segments collectively approximating the peripheral length of the circular recessed portion on the rotatable part which is frictionally engaged by said segments whereby the pressure of said segments is over substantially the entire circular recessed portion of the rotatable part driven thereby, blunt blocks for locking said rotatable parts in driving association with each other in one direction of movement, there being drum-shaped ends on said blocks, each of said blocks having a length approximately equal to twice the diameter of the drum-shaped ends thereof, cylindric recesses in said segments and the rotatable part clearing the same, the extent of the walls of said cylindric recesses exceeding 180 degrees and adapting said recessed portions to positively retain said drum-shaped ends of the respective blocks.

6. In a friction clutch mechanism, in combination, a rotatable driving part, a rotatable driven part, friction means comprising segments frictionally engaging one of said parts and clearing the other, there being a circular friction section on the rotatable part which is frictionally engaged by the segments, and each segment being provided with a corresponding friction surface portion for frictionally engaging the circular friction section of the rotatable part with which the segments frictionally engage, the friction surface portions of said segments collectively approximating the peripheral length of the circular friction section on the rotatable part which is frictionally engaged by said segments whereby the pressure of said segments is over substantially the entire circular friction section of the rotatable part driven thereby, thrust blocks for locking said rotatable parts in driving association with each other in one direction of movement, there being drum-shaped ends on said blocks, each of said blocks having a length approximately equal to twice the diameter of the drum-shaped ends thereof, cylindric recesses in said segments and the rotatable part clearing the same to receive and retain the drum-shaped ends of the respective blocks.

In testimony whereof I have signed my name to this specification.

ARTHUR SAHLI.